(12) United States Patent
Shimane et al.

(10) Patent No.: US 6,923,279 B2
(45) Date of Patent: Aug. 2, 2005

(54) POWER SUPPLY APPARATUS AND ELECTRIC VEHICLE USING THE SAME

(75) Inventors: Iwao Shimane, Saitama (JP);
Mitsuteru Yano, Saitama (JP);
Kazuhiro Hara, Saitama (JP);
Masanobu Asakawa, Saitama (JP);
Noriyuki Abe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,666

(22) Filed: Aug. 9, 2002

(65) Prior Publication Data
US 2003/0029654 A1 Feb. 13, 2003

(30) Foreign Application Priority Data
Aug. 10, 2001 (JP) .......................................... 2001-243797

(51) Int. Cl.[7] .............................. B60K 1/00; B60K 6/00
(52) U.S. Cl. .................... 180/65.1; 180/65.2; 180/65.4; 290/40 C; 320/104; 307/10.1
(58) Field of Search ................................. 320/104, 140, 320/141, 143; 307/9.1, 10.1, 10.6, 10.7, 46, 43; 318/139; 180/65.1, 65.2, 65.3, 65.4; 290/40 C, 406

(56) References Cited

U.S. PATENT DOCUMENTS

| 5,796,175 | A | * | 8/1998 | Itoh et al. ............... 307/10.1 |
| 5,965,991 | A | * | 10/1999 | Koike et al. ............. 318/139 |
| 5,986,416 | A | * | 11/1999 | Dubois .................... 318/139 |
| 6,002,221 | A | * | 12/1999 | Ochiai et al. ............. 318/139 |
| 6,114,775 | A | * | 9/2000 | Chung et al. ............ 307/10.1 |
| 6,204,769 | B1 | * | 3/2001 | Arai et al. ............... 340/632 |
| 6,323,608 | B1 | * | 11/2001 | Ozawa .................... 318/139 |
| 6,333,612 | B1 | * | 12/2001 | Suzuki et al. ............. 318/432 |
| 6,335,574 | B1 | * | 1/2002 | Ochiai et al. ............ 290/40 C |
| 6,507,506 | B1 | * | 1/2003 | Pinas et al. ............... 363/79 |
| 6,578,649 | B1 | * | 6/2003 | Shimasaki et al. ......... 180/65.2 |

FOREIGN PATENT DOCUMENTS

| JP | 62-173901 | 7/1987 |
| JP | 03-065049 | 3/1991 |
| JP | 5-344605 | 12/1993 |
| JP | 6-54410 | 2/1994 |
| JP | 07-177674 | 7/1995 |
| JP | 10-304501 | 11/1998 |
| JP | 11-8910 | 1/1999 |
| JP | 11-164494 | 6/1999 |

OTHER PUBLICATIONS

English language translation of Office Action from Japan Patent Office for Application No. 2001–243797 dated Aug. 30, 2004.

* cited by examiner

Primary Examiner—Christopher Ellis
Assistant Examiner—Brian Swenson
(74) Attorney, Agent, or Firm—Westerman, Hattori, Daniels & Adrian, LLP

(57) ABSTRACT

In a power supply apparatus for a vehicle, an inverter circuit inputs a voltage from a first battery unit through switches. A smoothing condenser is provided between the first battery unit and the inverter circuit in parallel. A DC-DC converter is provided between the smoothing condenser and a second battery unit to voltage-convert electric energy stored in the first battery unit or the smoothing condenser to supply to the second battery unit, and to voltage-convert electric energy stored in the second battery unit to supply to the smoothing condenser. An electronic control unit controls the DC-DC converter before starting power supply to the inverter circuit, such that the switches are closed after the smoothing condenser is charged to a voltage within a predetermined permission voltage range from the voltage of the first battery unit.

21 Claims, 12 Drawing Sheets

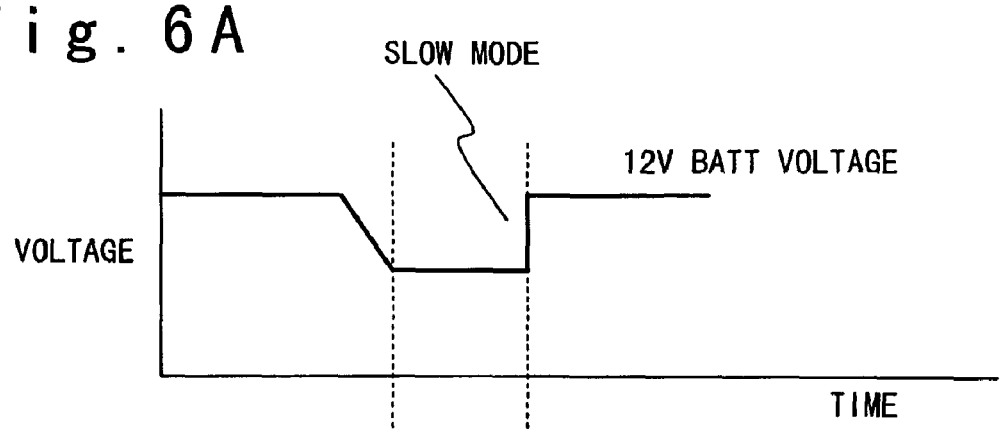
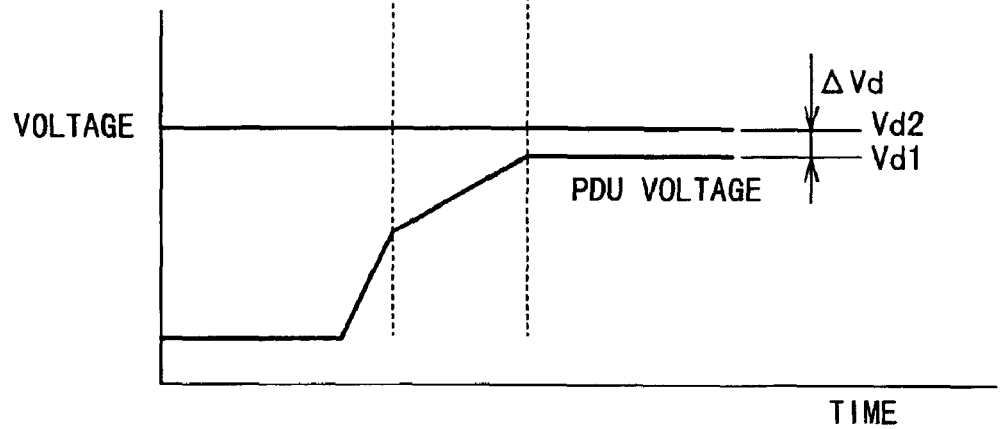

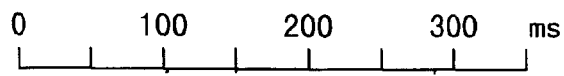

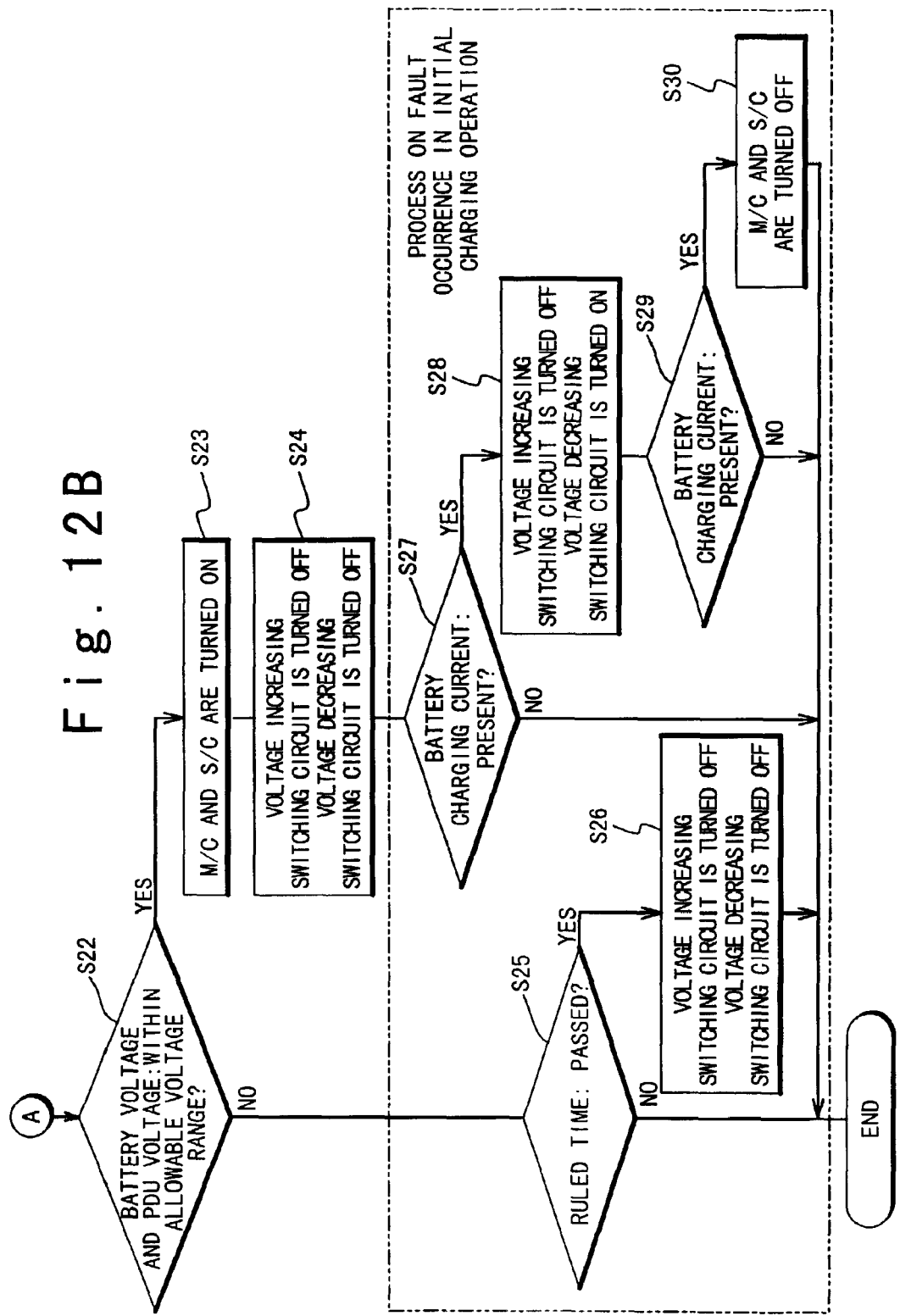

POWER SUPPLY APPARATUS AND ELECTRIC VEHICLE USING THE SAME

BACKGROUND OF THE INVENTION

1. Field of the Invention

The present invention relates to a power supply apparatus and a vehicle using the same.

2. Description of the Related Art

In recent years, a hybrid electric automobile is developed and has begun to be served to a practical use. FIG. 1 shows an example of a power supply apparatus installed into the hybrid electric automobile. The hybrid electric automobile using the power supply apparatus is comprised of a main battery (BATT) 10, a junction box (J/B) 20, a power drive unit (PDU) 30, a motor 40, an auxiliary battery 60, a load 70, an electronic control unit (ECU) 80 and a DC-DC converter 90.

The main battery 10 stores and outputs the DC power of as high voltage as 144 V. The output of the main battery 10 is supplied to the power drive unit 30 and the DC-DC converter 90 via the junction box 20.

The junction box 20 accommodates a main switch 21, fuses 22 and 23, a main contactor 24a, a sub-contactor 24b, a resistor 25 and a switch 26. The main switch 21 and the fuse 22 are inserted in series on a current path in the main battery 10.

The main switch 21 is of a manual operation type and is used to stop the output of the main battery 10 compulsorily in case of check of the vehicle. The fuse 22 fuses when over-current flows through the main battery 10, and stops the output of the main battery 10 compulsorily. The fuse 23 is provided for the current path on the input side of the DC-DC converter 90, and fuses when over-current flows through the DC-DC converter 90, and stops the power supply to the DC-DC converter 90 compulsorily.

The main contactor 24a is a 2-terminal switch and is inserted between the output terminal of the main battery 10 and the input terminal of the power drive unit 30. Also, the resistor 25 and the switch 26 connected in series are inserted in parallel to the main contactor 24a. The sub-contactor 24b is also a 2-terminal switch and is provided for the current path between the negative terminal of the smoothing condenser 31 and the negative terminal of the main battery 10.

The power drive unit 30 is comprised of an inverter circuit 30a which converts DC power from the main battery 10 into 3-phase AC power. The smoothing condenser 31 is connected with the input terminal in parallel to the inverter circuit 30a. The smoothing condenser 31 is provided to restrain rush current flowing through the power drive unit 30 in case of power-on. The 3-phase AC power outputted from the power drive unit 30 is supplied to the motor 40. The motor 40 has a generator function of AC power in addition to the motor function, and the rotation axis is connected with a crankshaft of an internal combustion engine (not shown). When operating as the motor, the motor 40 is rotatively driven by the 3-phase AC power from the power drive unit 30 to rotate wheels (not shown) through a gear machine and to help the drive of the internal combustion engine. Also, when operating as the generator, the motor 40 is rotatively driven by the internal combustion engine (not shown) and generate AC power. The AC power generated by the motor 40 is converted into the DC power through the inverter circuit 30a and the smoothing condenser 31 and is used to charge the main battery 10 directly, and charges the auxiliary battery 60 through the DC-DC converter 90.

As described above, the DC-DC converter 90 converts the high voltage DC power generated by the motor 40 and smoothed by the smoothing condenser 31 into low voltage DC power. Also, the DC-DC converter 90 converts high voltage DC power sent from the main battery 10 via the junction box 20 into low voltage DC power. The auxiliary battery 60 and the load 70 are connected with the output of the DC-DC converter 90. The auxiliary battery 60 is charged with the low voltage DC power outputted from the DC-DC converter 90.

Also, the load 70 is such as an air conditioner, wipers and so on, and are driven by the low voltage DC power from the auxiliary battery 60 and the DC power from the DC-DC converter 90. The electronic control unit 80 is composed of a microprocessor and controls the whole power supply apparatus.

The operation of the conventional hybrid electric automobile using the power supply apparatus formed as described above, especially, the operation upon start-up will be described.

When an ignition key (not shown) is operated, the main switch 21 is turned on and the electronic control unit 80 turns on a relay RY1 and a relay RY3 to set the switch 26 and the sub-contactor 24b in the junction box 20 to the ON state. By this, the DC power from the main battery 10 charges the smoothing condenser 31 via the resistor 25 and the switch 26 and is supplied to the power drive unit 30. Because the current supplied to the power drive unit 30 is limited by the resistor 25, the charging operation to the smoothing condenser 31 is gentle.

When the smoothing condenser 31 is charged to a predetermined voltage, the electronic control unit 80 sets the relay RY2 to the ON state and the relay RY1 to an OFF state. The relay RY3 continues the ON state. Thus, the main contactor 24a is set to the ON state and the switch 26 is set to the OFF state. In this way, the DC power from the main battery 10 is directly supplied to the power drive unit 30 via the main contactor 24a. The inverter circuit 30a carries out a switching operation to the DC power to convert the DC power from the main battery 10 into 3-phase AC power, and the power drive unit 30 supplies the 3-phase power to the motor 40. Thus, the motor 40 is rotatively driven.

On the other hand, the DC-DC converter 90 converts high voltage DC power from the main battery 10 or the smoothing condenser 31 into low voltage DC power and supplies to the auxiliary battery 60 and the load 70. Thus, the auxiliary battery 60 is charged and the drive of the load 70 becomes possible.

As described above, the conventional hybrid electric automobile using the power supply apparatus is comprised of the resistor and the switch to charge the smoothing condenser gently. Because large current flows through the resistor and the switch in the high voltage, a high breakdown voltage and a breakdown current are required to the resistor and the switch. As a result, the resistor and the switch become expensive and the manufacturing cost of the power supply apparatus rises.

In conjunction with the above description, an electric system of an electric automobile is disclosed in Japanese Laid Open Patent application (JP-A-Heisei 5-344605). The electric system of the electric automobile in this reference is comprised of a main battery for vehicle drive, an auxiliary battery for auxiliary units and an inverter which has a smoothing condenser. The power is supplied to an AC motor for the vehicle drive from the main battery through the inverter. The initial charging circuit of the input condenser is comprised of an insulation type combination reactor, a semiconductor switching device connected between the primary side of the combination reactor and the auxiliary battery, and a rectifier connected between the secondary side of the combination reactor and the inputting condenser. The input condenser is charged in the initial stage by the initial charging circuit.

Also, an electric system of an electric automobile is disclosed in Japanese Laid Open Patent application (JP-A-Heisei 6-54410). The electric system of the electric automobile in this reference is comprised of a main battery for vehicle drive and an auxiliary battery for auxiliary units. The power is supplied to an AC motor for the vehicle drive from the main battery through an inverter. The auxiliary battery is charged by the AC output from the inverter. Also, the DC-DC converter using the auxiliary battery as a power supply carries out an initial charging operation to an input condenser in case of start-up of the inverter.

Also, a control system of an electric automobile is disclosed in Japanese Laid Open Patent application (JP-A-Heisei 10-304501). The control system of the electric automobile in this reference is comprised of an inverter which converts DC power of a main battery into AC power and drives a running motor. A main contactor is provided between the main battery and the inverter. A precharge contactor is provided between the main battery and the inverter. A control unit closes a precharge contactor to precharge a condenser and closes the main contactor when determining that the precharge has ended. A current sensing station detects precharge current. The control unit determines that the precharge has ended when the precharge current is lower than a reference value after a predetermined time from the start of the precharging operation.

Also, a power supply apparatus of a hybrid electric automobile is disclosed in Japanese Laid Open Patent application (JP-A-Heisei 11-8910). In the power supply apparatus of this reference, a main battery charges an auxiliary battery through a DC-DC converter. A high voltage circuit section carries out a so-called inverter operation and supplies AC power to a coil on the side of the large number of turns of a transformer in case of power supply from the main battery to an auxiliary battery, and carries out a rectifying operation in case of power supply from the auxiliary battery to the main battery. A low voltage circuit section carries out a rectifying operation in case of power supply from the main battery to the auxiliary battery, and carries out the inverter operation and supplies AC power to a coil on the side of the small number of turns of the transformer in case of power supply from the auxiliary battery to the main battery. According to the power supply apparatus, the power transmission from the auxiliary battery to the motor for engine start can be realized with a simple circuit.

Also, a hybrid electric automobile is disclosed in Japanese Laid Open Patent application (JP-A-Heisei 11-164494). The hybrid electric of this reference is comprised of a high voltage drive main battery which is driven in a high voltage and which supplies power to an engine start motor and a running motor, and an auxiliary battery which is driven in a low voltage and which supplies power to an auxiliary unit. An average charging power transmission section transmits power to one of both of the batteries. A control unit controls the average charging power transmission section such that one of the both batteries charges the other.

SUMMARY OF THE INVENTION

Therefore, an object of the present invention is to provide a vehicle or automobile using a power supply apparatus which has a simple circuit structure.

Another object of the present invention is to provide a vehicle or automobile using a power supply apparatus in which a smoothing condenser is charged from an auxiliary battery in an initial charging operation.

Another object of the present invention is to provide a vehicle or automobile using a power supply apparatus in which a charging rate is changeable in an initial charging operation.

Another object of the present invention is to provide a vehicle or automobile using a power supply apparatus in which a fault can be detected in an initial charging operation.

In an aspect of the present invention, a power supply apparatus for a vehicle, includes a first battery unit, a second battery unit for a lower voltage than the first battery unit, an inverter circuit, a smoothing condenser, a DC-DC converter and an electronic control unit. The inverter circuit inputs a voltage from the first battery unit through switches. The smoothing condenser is provided between the first battery unit and the inverter circuit in parallel. The DC-DC converter is provided between the smoothing condenser and the second battery unit to voltage-convert electric energy stored in the first battery unit or the smoothing condenser to supply to the second battery unit, and to voltage-convert electric energy stored in the second battery unit to supply to the smoothing condenser. The electronic control unit controls the DC-DC converter before starting power supply to the inverter circuit, such that the switches are closed after the smoothing condenser is charged to a voltage within a predetermined permission voltage range from the voltage of the first battery unit.

Here, the DC-DC converter may include a voltage decreasing switching circuit connected with the smoothing condenser, a voltage increasing switching circuit connected with the second battery unit, and a transformer provided between the voltage decreasing switching circuit and the voltage increasing switching circuit. The voltage increasing switching circuit is driven by the electronic control unit to carry out a switching operation such that the voltage from the second battery unit is boosted and supplied to the smoothing condenser. Also, the voltage decreasing switching circuit is driven by the electronic control unit to carry out a switching operation such that the voltage supplied through the switches from the first battery unit is decreased and supplied to the second battery unit.

In this case, the electronic control unit desirably stops the switching operation of the voltage increasing switching circuit, when the voltage applied to the smoothing condenser is higher than an output voltage of the first battery unit, and operates the voltage decreasing switching circuit.

Also, the electronic control unit desirably decreases a power supply duty of the voltage increasing switching circuit, when the voltage of the second battery unit decreases in case of the switching operation of the voltage increasing switching circuit.

Also, the electronic control unit desirably decreases a switching frequency of a switching element of the voltage increasing switching circuit, when the voltage of the second battery unit decreases in case of the switching operation of the voltage increasing switching circuit.

Also, the electronic control unit may check a charging current to and a discharging current from the first battery unit after the switches are closed, and may output an extraordinary signal when the charging current is detected.

Also, the electronic control unit may check the charging current to and the discharging current from the first battery unit after the switches are closed, and drives the voltage decreasing switching circuit until the voltage applied to the smoothing condenser becomes lower by a predetermined voltage than the voltage of the first battery unit when the charging current is detected.

Also, the electronic control unit may open the switches and outputs an extraordinary signal, when the voltage applied to the smoothing condenser does not become lower by the predetermined voltage than the voltage of the first battery unit, even if the electronic control unit drives the voltage decreasing switching circuit.

Also, the power supply apparatus of the vehicle may further include an internal combustion engine, and a motor which is driven by the inverter circuit and is driven by the internal combustion engine to generate electric power. The electronic control unit increases the power supply duty of the voltage increasing switching circuit when a start request of the internal combustion engine is issued.

Also, the power supply apparatus of the vehicle may further include an internal combustion engine, and a motor which is driven by the inverter circuit and is driven by the internal combustion engine to generate electric power. The electronic control unit may increase the switching frequency of the switching element of the voltage increasing switching circuit when the start request of the internal combustion engine is issued.

In another aspect of the present invention, an automobile includes a first battery unit for a higher DC voltage power, a second battery unit for a lower DC voltage power, a smoothing condenser and a DC-DC converter. The smoothing condenser is selectively connected with the first battery unit, and is provided to supply power obtained from the high DC voltage power of the first battery unit to a motor in a steady state in which the automobile is driven with the power. The DC-DC converter is connected with the smoothing condenser and the second battery unit, and is provided to charge the smoothing condenser using the lower DC voltage power of the second battery unit in an initial precharging state prior to the steady state.

Here, the automobile may further include an electronic control unit which controls the DC-DC converter based on at least one of a charged voltage of the smoothing condenser, a voltage of the second battery unit, and an engine start request.

The electronic control unit may control the DC-DC converter based on the charged voltage of the smoothing condenser such that a voltage obtained by boosting a voltage of the second battery unit is increased, when the charged voltage of the smoothing condenser is equal to or lower than a first threshold voltage.

Also, the electronic control unit may control the DC-DC converter based on the charged voltage of the smoothing condenser such that a voltage obtained by boosting a voltage of the second battery unit is decreased, when the charged voltage of the smoothing condenser is higher than a second threshold voltage which is higher than the first threshold voltage.

Also, the electronic control unit may control the Dc-DC converter based on absence of the engine start request such that the smoothing condenser is charged in a normal mode in a predetermined rate.

In this case, the electronic control unit may control the Dc-DC converter based on presence of the engine start request such that the smoothing condenser is charged in a quick mode in a larger rate than the predetermined rate.

Also, the electronic control unit controls the Dc-DC converter based on the voltage of the second battery unit such that the smoothing condenser is charged in a slow mode in a smaller rate than the predetermined rate.

Also, the DC-DC converter may include a transformer, a voltage decreasing switching circuit and a voltage increasing switching circuit. The voltage decreasing switching circuit is provided between the smoothing condenser and the transformer, to rectify first input power from the transformer in case of no control signal and to carry out a first switching operation to second input power from the smoothing condenser in response to a voltage decreasing control signal to decrease an output voltage. The voltage increasing switching circuit is provided between the second battery unit and the transformer, to rectify third input power from the transformer in case of no control signal and to carry out a second switching operation to fourth input power from the second battery unit in response to a voltage increasing control signal to increase an output voltage.

In this case, the automobile may further include an electronic control unit which issues the voltage increasing control signal to the voltage increasing switching circuit in the initial charging operation, when the charged voltage of the smoothing condenser is equal to or lower than a first threshold voltage.

In this case, the electronic control unit may issue the voltage decreasing control signal to the voltage decreasing switching circuit in the initial charging operation, when the charged voltage of the smoothing condenser is higher than a second threshold voltage which is higher than the first threshold voltage.

Also, the electronic control unit may control the second switching operation such that at least one of a switching frequency and a switching duty is larger than a corresponding one of a predetermined switching frequency and a predetermined switching duty when the engine start request is present.

Also, the electronic control unit may control the second switching operation such that at least one of a switching frequency and a switching duty is equal to the corresponding one of the predetermined switching frequency and the predetermined switching duty when the engine start request is not present.

Also, the electronic control unit controls the second switching operation such that at least one of a switching frequency and a switching duty is smaller than to the corresponding one of the predetermined switching frequency and the predetermined switching duty when the voltage of the second battery unit falls.

Also, the electronic control unit may connect the first battery unit with the smoothing condenser to enter the steady state when the initial charging operation is ended. Also, the electronic control unit desirably detects a fault when there is a battery charging current in the steady state.

BRIEF DESCRIPTION OF THE DRAWINGS

FIGS. 6A and 6B are timing charts showing the operation of the vehicle using the power supply apparatus according to the first embodiment of the present invention;

FIGS. 7A to 7G are timing charts showing the overall operation of the vehicle using the power supply apparatus according to the first embodiment of the present invention when an initial PDU voltage is 0 V;

FIGS. 12A and 12B are a flow chart showing the operation of the vehicle using the power supply apparatus according to the second embodiment of the present invention.

DESCRIPTION OF THE PREFERRED EMBODIMENTS

Hereinafter, a vehicle using a power supply apparatus of the present invention will be described in detail with reference to the attached drawings.

(First Embodiment)

Figure 1:
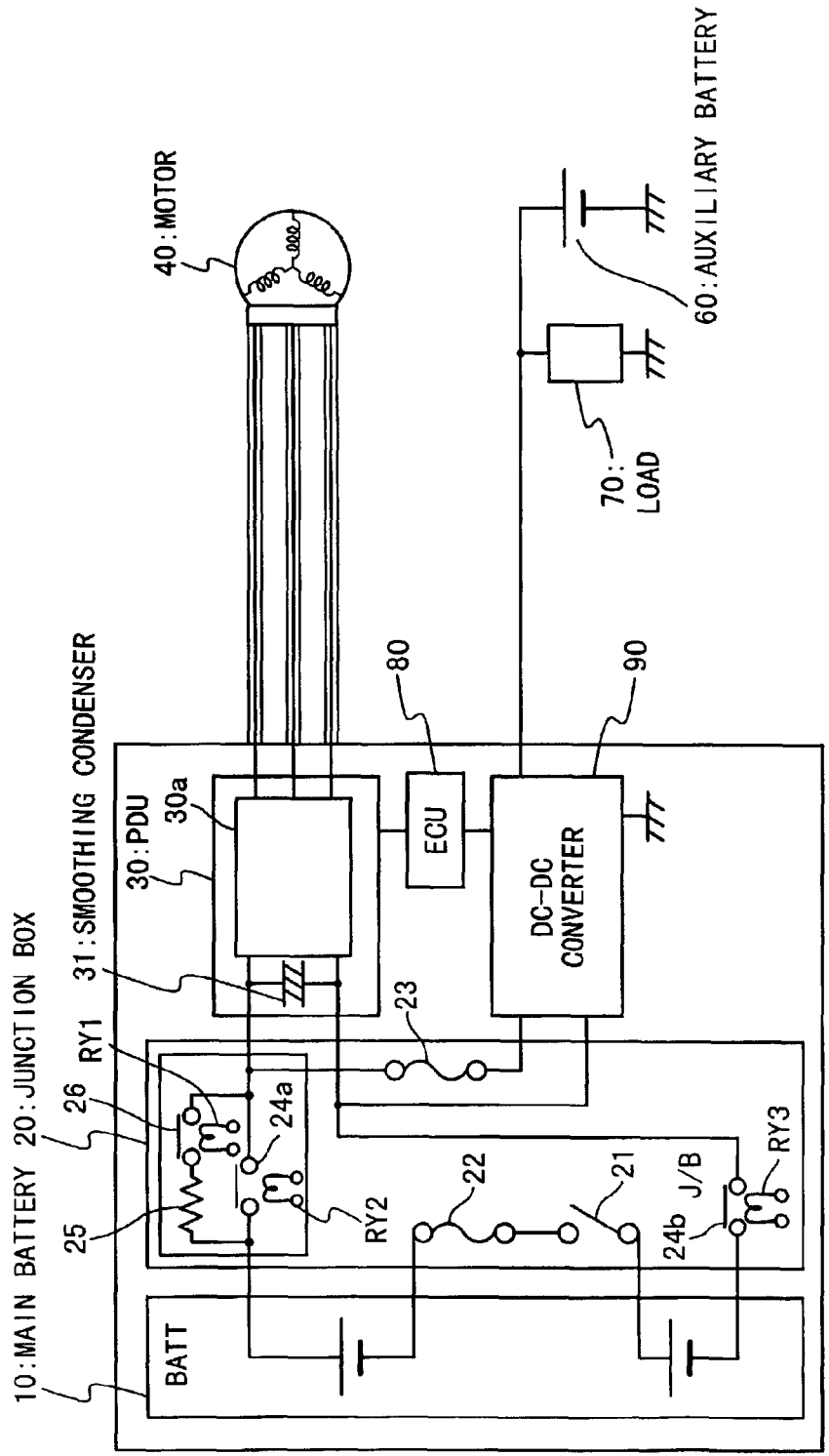
FIG. 1 is a block diagram showing a conventional hybrid electric automobile using a power supply apparatus.
Figure 2:
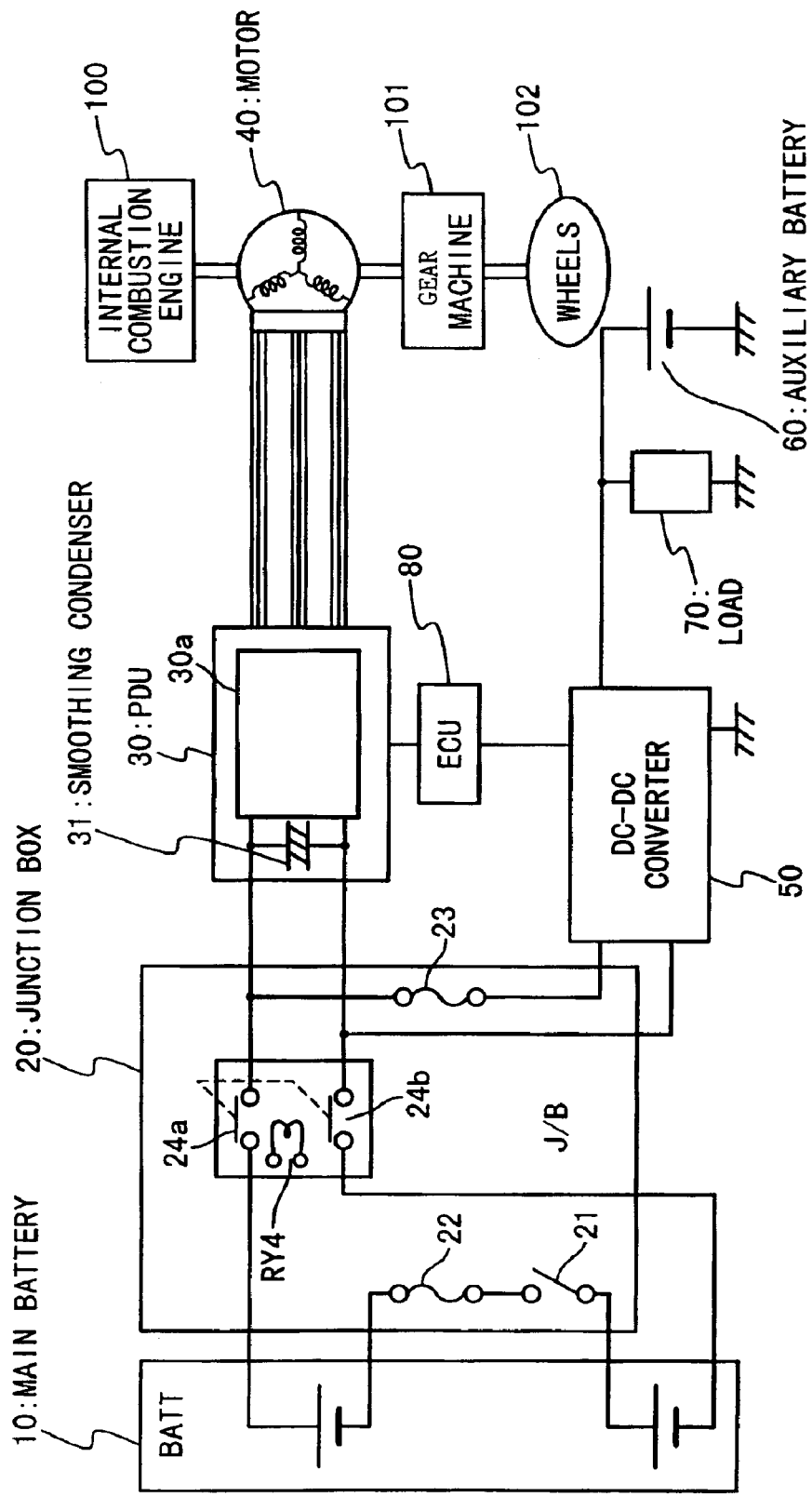
FIG. 2 is a block diagram showing the circuit structure of a vehicle using a power supply apparatus according to a first embodiment of the present invention.
Figure 8:
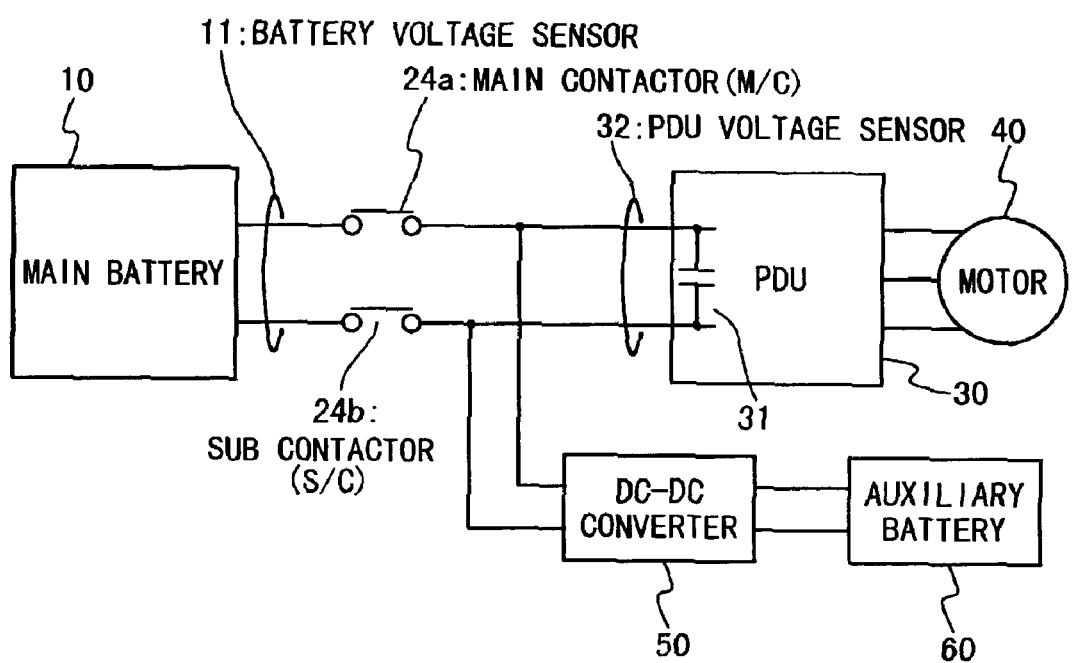
FIG. 8 is a block diagram showing the simplified circuit structure of the vehicle using the power supply apparatus according to the first embodiment of the present invention.

FIG. 2 is a block diagram showing the circuit structure of the vehicle using the power supply apparatus according to the first embodiment of the present invention. FIG. 8 shows the simplified circuit structure of it. Referring to FIGS. 2 and 8, the vehicle using the power supply apparatus is comprised of a main battery (BATT) 10 as a first power unit, a junction box (J/B) 20, a power drive unit (PDU) 30 with a smoothing condenser 31, a motor 40, a DC-DC converter 50, an auxiliary battery 60 as a second power unit, a load 70 and an electronic control unit (ECU) 80. The motor 40 is coupled to a crankshaft between an internal combustion engine 100 and a gear machine 101, and wheels 102 are connected to the gear machine 101.

The main battery 10 outputs the DC power of as high voltage as 144 V. The power outputted from the main battery 10 is supplied to the power drive unit 30 and the DC-DC converter 50 via the junction box 20.

The junction box 20 accommodates a main switch 21, fuses 22 and 23, and a relay RY4 with a main contactor 24a and a sub-contactor 24b. The main switch 21 and the fuse 22 connected in series are inserted in the middle portion of a current route from the main battery 10 to break the current route. The main switch 21 is of a manual operation type and is used to stop the output of the main battery 10 compulsorily in case of check of the vehicle. The fuse 22 fuses when over-current flows through the main battery 10, and stops the output of the main battery 10 compulsorily. The fuse 23 fuses when over-current flows through the DC-DC converter 90, and stops power supply to the DC-DC converter 90 compulsorily.

The main contactor 24a is a 2-terminal switch and is inserted between the output terminal of the main battery 10 and the input terminal of the power drive unit 30 in series. Also, the sub-contactor 24b is a 2-terminal switch, and is provided for the current route to connect the negative terminal of the smoothing condenser 31 and the negative terminal of the main battery 10. The main contactor 24a and the sub-contactor 24b are controlled in association with the operation of the single relay RY4.

The power drive unit (PDU) 30 is comprised of a smoothing condenser 31 and an inverter circuit 30a. The inverter circuit 30a is formed by connecting switching elements (not shown) in a bridge. The inverter circuit 30a converts the DC power from the main battery 10 into 3-phase AC power in a motor running mode using the motor 40, and the 3-phase AC power is supplied to the motor 40. Also, the inverter circuit 30a converts 3-phase AC power from the motor into DC power in an engine running mode using the internal combustion engine 100, and the smoothing condenser is charged with the DC power from the inverter circuit 30a. The smoothing condenser 31 is connected with the input terminal side of the inverter circuit 30a in parallel. The smoothing condenser 31 is provided to suppress rush current flowing in case of turning on of the power supply apparatus and to smooth the DC power charged therein.

The motor 40 is driven with the 3-phase AC power from the inverter circuit 30a of the power drive unit 30, drives the internal combustion engine 100 auxiliary, and drives the wheels 102 through the gear machine 101. The motor 40 also functions as a power generator when the motor 40 is driven by the internal combustion engine 100 to generate the 3-phase AC power.

The DC-DC converter 50 carries out DC voltage conversion in bi-direction. That is, the DC-DC converter 50 decreases high voltage DC power supplied from the smoothing condenser 31 or the main battery 10 into low voltage DC power in a voltage decreasing mode to output it to the auxiliary battery 60. Also, the DC-DC converter 50 converts low voltage DC power from the auxiliary battery 60 into high voltage DC power in a voltage increasing mode to supply it to the smoothing condenser 31. Specifically, the DC-DC converter 50 decreases the high voltage of the DC power supplied via the junction box 20 from the main battery 10 into a low voltage. Also, the DC-DC converter 50 boosts up the low voltage of the DC power supplied from the auxiliary battery 60 into a high voltage. The DC-DC converter 50 will be described later in detail.

The auxiliary battery 60 as the second battery apparatus and the load 70 are connected with the output of the DC-DC converter 50. For example, the auxiliary battery 60 stores and outputs the DC power of as low voltage as 12 V. The auxiliary battery 60 is charged in the low voltage DC power from the DC-DC converter 50. Also, the load 70 is such as an air conditioner and wipers. The load 70 is driven with the DC power from the auxiliary battery 60 and the DC power from the DC-DC converter 50.

The electronic control unit 80 is composed of a microprocessor, and controls the whole power supply apparatus. The operation of the electronic control unit 80 will be described later in detail with reference to the flow chart.

It should be noted that a battery voltage sensor 11 is provided on the output terminal side of the main battery 10 as shown in FIG. 8. Also, a PDU voltage sensor 32 is provided on the input terminal side of the power drive unit 30, to detect the voltage applied between the input terminals of the unit 30, i.e., the voltage applied to the both terminals of the smoothing condenser 31. Also, an auxiliary voltage sensor (not shown) is provided to detect the voltage of the auxiliary battery 60.

Figure 3:
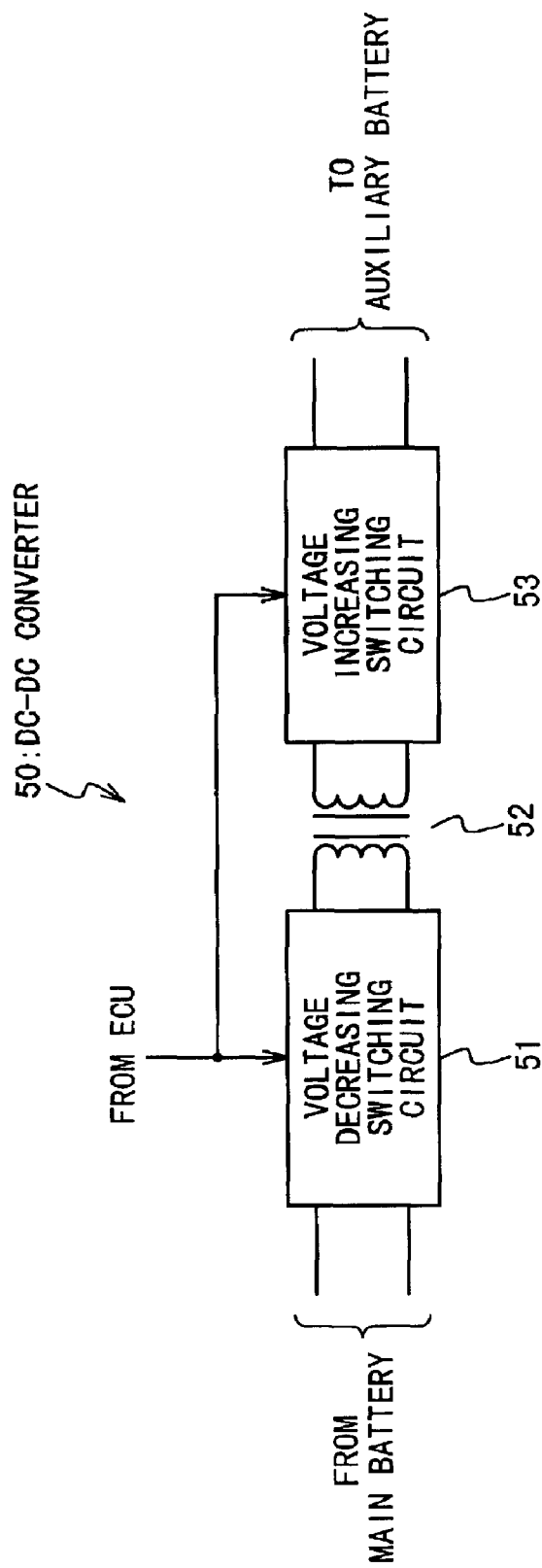
FIG. 3 is a block diagram showing the detailed circuit structure of a DC-DC converter in FIG. 2.

Next, the DC-DC converter 50 will be described with reference to the circuit diagram shown in FIG. 3. The DC-DC converter 50 is composed of a voltage decreasing switching circuit 51, a transformer 52 and a voltage increasing switching circuit 53. The voltage decreasing switching circuit 51 is connected with the smoothing condenser 31 via a fuse 23. The voltage decreasing switching circuit 51 has a rectifying function and a voltage decreasing function. The voltage increasing switching circuit 53 is connected with the auxiliary battery 60 and the load 70. The voltage increasing switching circuit 53 has a rectifying function and a voltage increasing function.

It should be noted that a "voltage decreasing mode" is set when the electronic control unit 80 controls the voltage decreasing switching circuit 51 of the DC-DC converter 50 to decrease the output voltage from the voltage decreasing switching circuit 51. Also, a "voltage increasing mode" is set when the electronic control unit 80 controls the voltage increasing switching circuit 53 of the DC-DC converter 50 to increase the output voltage from the voltage increasing switching circuit 53.

The voltage decreasing switching circuit 51 carries out a switching operation on the high voltage DC power from the main battery 10 or the smoothing condenser 31 at a predetermined reference frequency and a predetermined reference duty in the voltage decreasing mode to convert the high voltage DC power into a low voltage AC power and sends the low voltage AC power to the transformer 52. Also, the voltage decreasing switching circuit 51 rectifies AC power from the transformer 52 in the voltage increasing mode to convert into the DC power. The voltage decreasing switching circuit 51 separates the transformer 52 from the smoothing condenser 31 or the main battery 10 in a no-operation mode set by the electronic control unit 80.

The voltage increasing switching circuit 53 rectifies low voltage AC power from the transformer 52 in the voltage decreasing mode to convert the low voltage AC power into the low voltage DC power. Also, the voltage increasing switching circuit 53 carries out a switching operation on the low voltage DC power from the auxiliary battery 60 at a predetermined reference frequency and a predetermined reference duty in the voltage decreasing mode to convert the low voltage DC power into a high voltage AC power and sends the high voltage AC power to the transformer 52. The voltage increasing switching circuit 53 separates the transformer 52 from the auxiliary battery 60 in a no-operation mode set by the electronic control unit 80.

The frequency and duty of each of the voltage decreasing switching circuit 51 and the increasing switching circuit 53 in the switching operation can be controlled by the electronic control unit 80.

The transformer 52 has the larger number of turns on the side of the decreasing switching circuit 51 and the smaller number of turns on the side of the increasing switching circuit 53.

In the above-mentioned structure, the DC-DC converter 50 converts the high voltage DC power from the main battery 10 or the smoothing condenser 31 into the low voltage DC power in the voltage decreasing mode, and supplies to the auxiliary battery 60. Oppositely, in the voltage increasing mode, the DC-DC converter 50 converts the low voltage DC power from the auxiliary battery 60 into the high voltage DC power and supplies to the smoothing condenser 31 of the power drive unit 30.

Next, the operation of the vehicle using the power supply apparatus according to the first embodiment of the present invention will be described with respect of the starting operation mainly.

When an ignition key (not shown) is turned on to turn on the main switch 21, the electronic control unit 80 keeps the main contactor 24*a* and the sub-contactor 24*b* in the junction box 20 to the off state, and sets the DC-DC converter 50 to the voltage increasing mode. By this, the DC-DC converter 50 converts the low voltage DC power from the auxiliary battery 60 into the high voltage DC power and supplies to the smoothing condenser 31. Thus, an initial charging operation (precharging operation) of the smoothing condenser 31 is started.

Figure 4:
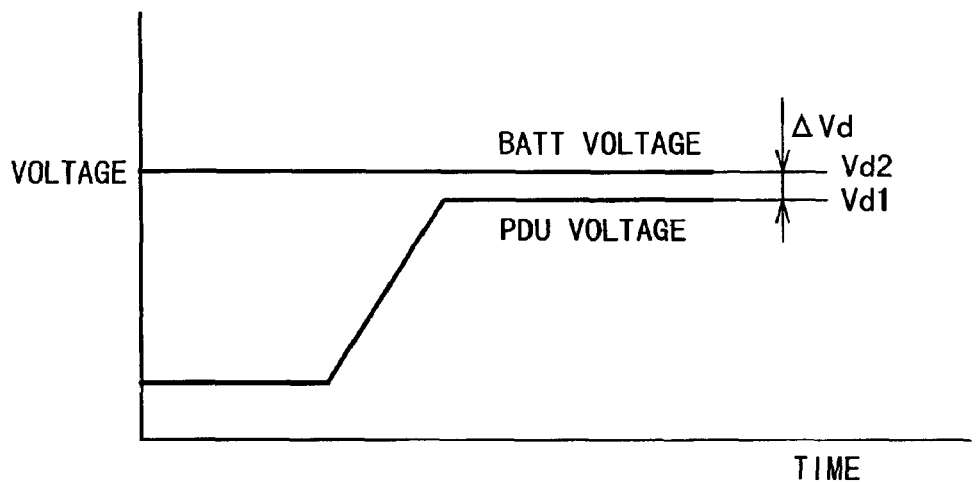
FIG. 4 is timing charts showing the operation of the vehicle using the power supply apparatus according to the first embodiment of the present invention.

The electronic control unit 80 monitors the PDU voltage sensor 32 during the above initial charging operation. As shown in FIG. 4, when the PDU voltage sensor 32 detects that the voltage of the smoothing condenser 31 is equal to or higher than a first threshold voltage Vd1 and lower than a second threshold value Vd2, the electronic control unit 80 controls the single relay RY4 to set the main contactor 24*a* and the sub-contactor 24*b* to the ON state, and sets the DC-DC converter 50 to voltage decreasing mode. Hereinafter, the voltage of the smoothing condenser 31 is referred to as a PDU voltage, and the voltage of the main battery 10 is referred to as a BATT voltage. Also, the first threshold voltage Vd1 is lower by a predetermined voltage ΔVd than the BATT voltage, and the threshold voltage Vd2 is equal to or higher by a predetermined voltage than the BATT voltage.

Through the initial charging operation, the power supply apparatus reaches a steady state such that the high voltage DC power from the main battery 10 is directly supplied to the power drive unit 30 via the main contactor 24*a* and the smoothing condenser 31. The power drive unit 30 converts the high voltage DC power into the 3-phase AC power and sends to the motor 40. The motor 40 is driven with the 3-phase AC power.

Also, the DC-DC converter 50 converts the high voltage DC power from the main battery 10 into the low voltage DC power and supplies to the auxiliary battery 60 and the load 70. Thus, the charging operation of the auxiliary battery 60 is carried out, and the drive of the load 70 becomes possible.

Figure 5:
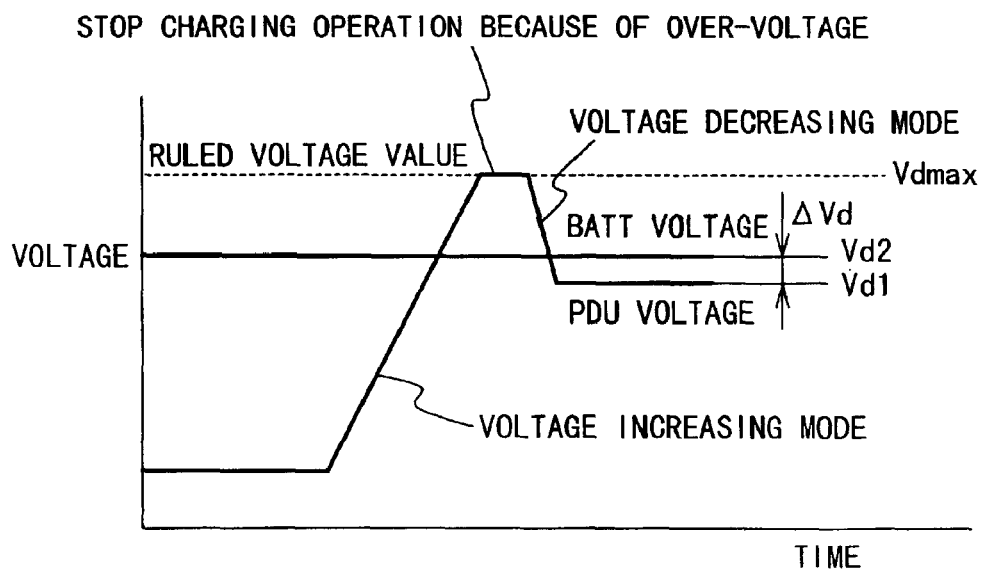
FIG. 5 is timing charts showing the operation of the vehicle using the power supply apparatus according to the first embodiment of the present invention.

In the above-mentioned initial charging operation of the smoothing condenser 31, as shown in FIG. 5, there is a case that the PDU voltage exceeds the second threshold voltage Vd2 in a permission voltage range between the first threshold voltage Vd1 and the second threshold voltage Vd2. In this case, the PDU voltage approaches or reaches an upper limit voltage Vdmax. The electronic control unit 80 sends a voltage decreasing mode signal to the DC-DC converter 50 to set the DC-DC converter 50 to the voltage decreasing mode in place of the voltage increasing mode. By this, the smoothing condenser 31 starts a discharging operation through the power consumption in the DC-DC converter 50, and the voltage across the smoothing condenser 31 decreases.

The electronic control unit 80 monitors the PDU voltage sensor 32 during the above discharging operation. As shown in FIG. 5, when the PDU voltage sensor 32 detects that the PDU voltage of the smoothing condenser 31 decreases to a voltage within the predetermined permission voltage range ΔVd (rule common difference) from the upper limit voltage, the electronic control unit 80 sets the main contactor 24*a* and the sub-contactor 24*b* to the ON state. By this, the power supply apparatus enters the steady state.

Also, in the power supply apparatus, when an auxiliary battery voltage sensor (not shown) detects that the voltage of the auxiliary battery 60 rapidly decreases during the initial charging operation to the above smoothing condenser 31, the time period for the initial charging operation is elongated to prevent the rapid voltage down of the auxiliary battery 60. That is, when the output voltage of the auxiliary battery 60

(hereinafter, to be referred to as a "12V BATT voltage") decreases rapidly, the electronic control unit 80 sets the power supply apparatus to a slow mode, as shown in FIG. 6A. In the slow mode, the switching frequency of the voltage increasing switching circuit 53 in the DC-DC converter 50 is decreased lower than the above reference frequency. Also, the duty of a switching operation (the ON duty of the switching element) is decreased lower than the above reference duty. Thus, as shown in FIG. 6B, the voltage increase of the smoothing condenser 31 is made gentle in the slow mode to prevent the rapid voltage down of the auxiliary battery 60.

Also, the electronic control unit 80 sets the power supply apparatus to a quick mode for the initial charging operation when an engine start request is present. However, the electronic control unit 80 sets the power supply apparatus to a normal mode in which the reference frequency and the reference duty are set as the switching frequency and the switching duty, otherwise.

Next, the overall operation of the power supply apparatus according to the first embodiment of the present invention will be described with reference to the timing chart shown in FIGS. 7A to 7G. It should be noted that it is supposed that an initial voltage of the PDU voltage is 0 V.

As shown in almost FIG. 7A, when power is turned ON by the ignition key IG and the main switch 21 is turned on, the electronic control unit 80 carries out an initializing process to initialize the whole power supply apparatus. Then, when the initializing process ends, the electronic control unit 80 issues a DVON signal of the ON state to the DC-DC converter 50 such that the DC-DC converter 50 is set to the voltage increasing mode, as shown in FIG. 7C. By this, the DC-DC converter 50 converts the low voltage DC power from the auxiliary battery 60 into the high voltage DC power and supplies to the smoothing condenser 31. Thus, the smoothing condenser 31 is charged and the PDU voltage rises.

When the PDU voltage exceeds 60 V, the power drive unit 30 sends a VPIN Ready signal to the electronic control unit 80, as shown in FIG. 7D. The electronic control unit 80 controls the PDU voltage sensor 32 to monitor the PDU voltage of the smoothing condenser 31 in response to the VPIN Ready signal. When the PDU voltage falls within the predetermined permission voltage range (ruled common difference) Δ Vd from the BATT voltage, the electronic control unit 80 sets the DVON signal to the OFF state to stop the switching operation of the DC-DC converter 50. Then, the electronic control unit 80 sets the main contactor 24*a* (M/C) and the sub-contactor 24*b* (S/C) to the ON state within a predetermined power supply standby time, as shown in FIG. 7E. In this way, the high voltage DC power from the main battery 10 is supplied to the power drive unit 30. As a result, the power supply apparatus enters the steady state.

As described above, according to the vehicle using the power supply apparatus according to the first embodiment, a voltage conversion function is added to the DC-DC converter 50, and the DC-DC converter 50 carries out the initial charging operation to the smoothing condenser 31 of the power drive unit 30. Therefore, a resistor and a switch for the suppression of rush current, which are used for the conventional power supply apparatus, can be omitted. As a result, the vehicle using the power supply apparatus can be manufactured in low cost.

Also, in the conventional vehicle using the power supply apparatus, three contactors (2-terminal switch) or relays need be provided in relation to the ON/OFF timings of them to realize the initial charging operation. However, the vehicle using the power supply apparatus according to the first embodiment can carry out the initial charging operation with the single relay. As a result, the vehicle using the power supply apparatus can be manufactured in low cost.

(Second Embodiment)

Next, the vehicle using the power supply apparatus according to the second embodiment of the present invention will be described. The power supply apparatus according to the second embodiment controls the output of the DC-DC converter variably and detects of a fault in the initial charging operation.

Figure 9:
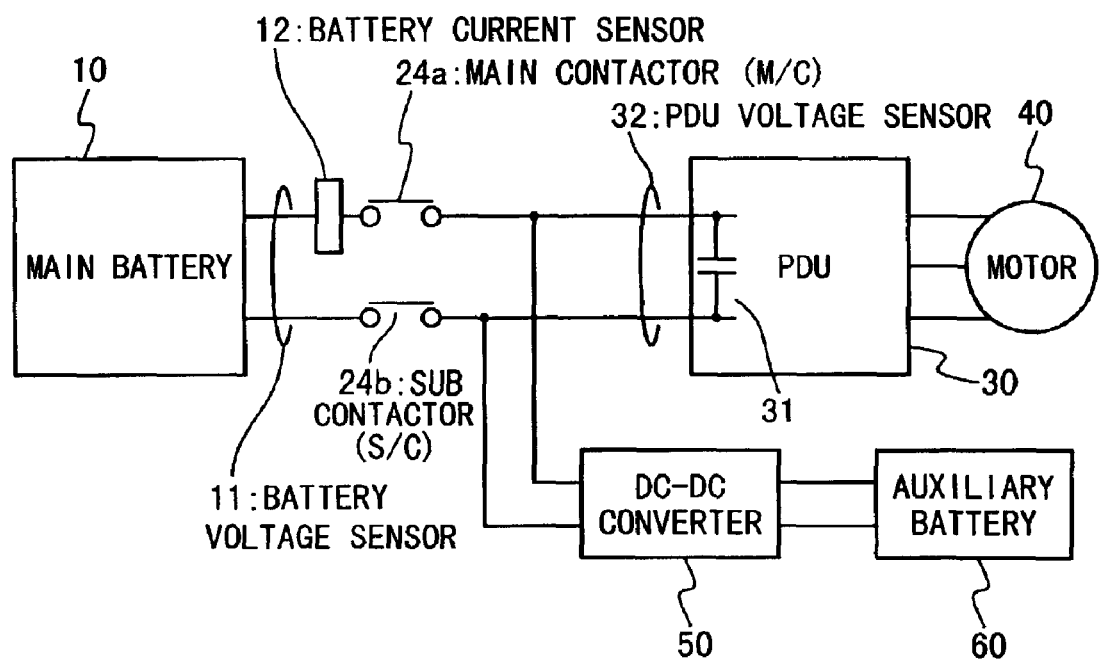
FIG. 9 is a block diagram showing the simplified circuit structure of the vehicle using the power supply apparatus according to a second embodiment of the present invention.

FIG. 9 is a block diagram showing the circuit structure of the power supply apparatus according to the second embodiment of the present invention. The circuit structure of the power supply apparatus according to the second embodiment is the same as the power supply apparatus according to the first embodiment shown in FIG. 8 except that a battery current sensor 12 is added.

In the initial charging operation in the conventional power supply apparatus, the initial charging time is principally determined based on the resistance of the resistor 25, the voltage of the main battery 10, the capacity of the smoothing condenser 31 and so on. Therefore, the system starting time becomes long.

On the other hand, in the power supply apparatus according to the second embodiment, the power supplied from the DC-DC converter 50 is made variable in the voltage increasing mode during the initial charging operation, and the system starting time is shortened. For the control of the power supply in the initial charging operation, a normal mode, a slow mode, and a quick mode are provided. Each of these modes is used as follows. That is, the initial charging operation in the start-up is carried out in the normal mode generally, in the quick mode when an engine start request is issued in addition to with a system start-up, and in the slow mode when the rapid voltage down of the auxiliary battery occurs.

In the normal mode, the switching frequency of the voltage increasing switching circuit 53 in the DC-DC converter 50 is set to a middle value which is higher than a value in the slow mode and is lower than a value in the quick mode. A switching duty is also set to a middle value.

In the quick mode, the switching frequency of the voltage increasing switching circuit 53 is set to the frequency which is larger than to the normal mode. Also, in the fast mode, a switching duty is set to the duty which is larger than the duty in the normal mode and is near the maximum duty.

In the slow mode, the switching frequency of the voltage increasing switching circuit 53 is set smaller than the value in the normal mode. The switching duty is also set smaller than the duty in the normal mode.

In the initial charging operation in the conventional power supply apparatus, it is impossible to restart the system when a fault occurs in the circuit for the initial charging operation. In the initial charging operation according to the above-mentioned first embodiment, when the voltage increasing or boosting operation of the DC-DC converter 50 does not stop due to the fault, the discharging operation from the auxiliary battery 60 continues even after connection of the main contactor 24*a* and the sub-contactor 24*b*. In the worst case, the auxiliary battery 60 becomes empty. Such a fault can be solved by adding a fault detection circuit. However, in such a case, the manufacturing cost of the power supply apparatus increases.

On the other hand, in the power supply apparatus according to the second embodiment, the battery current sensor 12 is provided between the main contactor 24*a* and the main battery 10 to carry out a fault detection based on the charging current and discharging current after the closure of the main contactor 24*a*.

Figure 10:
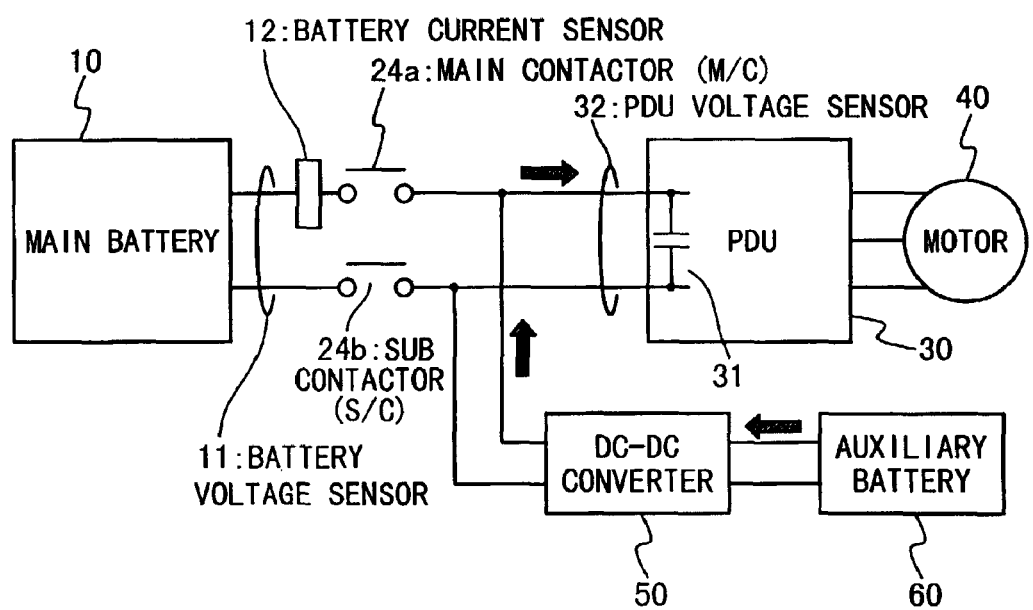
FIG. 10 is a diagram showing the flow of current in an initial charging operation in the vehicle using the power supply apparatus according to the second embodiment of the present invention.
Figure 11:
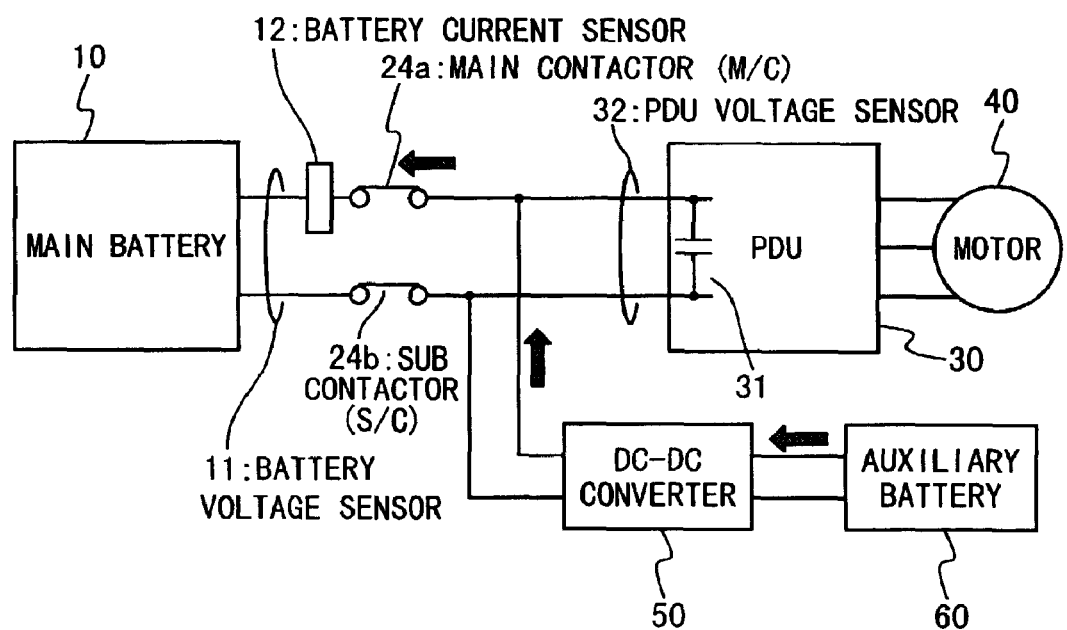
FIG. 11 is a diagram showing the flow of the current in case of fault occurrence of the vehicle using the power supply apparatus according to the second embodiment of the present invention.

It should be noted that FIG. 10 is a diagram showing relation between the state of the main contactor 24*a* and the current during the initial charging operation of the smoothing condenser 31. Moreover, FIG. 11 is a diagram showing relation between the state of the main contactor 24*a* and the current when a fault has occurred during the initial charging operation of the smoothing condenser 31.

Figure 12A:
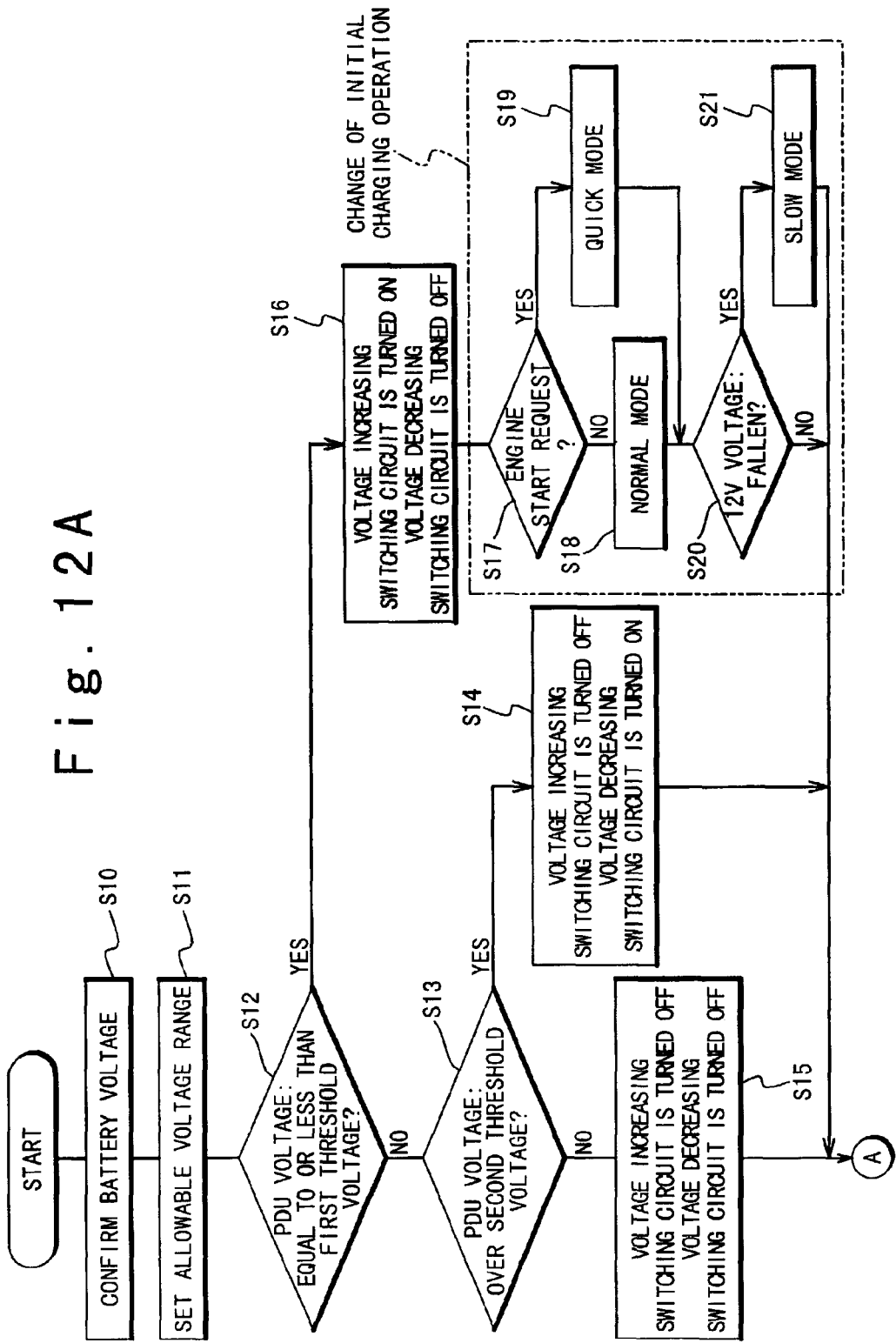

Next, the operation of the power supply apparatus will be described with reference to the flow charts shown in FIGS. 12A and 12B. It should be noted that the flow chart shown in FIGS. 12A and 12B are carried out by the electronic control unit 80.

First, the confirmation of the BATT voltage which is the output voltage of the main battery 10 is carried out (Step S10). That is, the BATT voltage and the PDU voltage at the present time are detected by the battery voltage sensor 11 and the PDU voltage sensor 32 and are stored in a memory (not shown) of the electronic control unit 80.

Next, the first threshold value Vd1 and the second threshold voltage Vd2 are set for the permission voltage range ΔVd of the PDU voltage (Step S11). The first threshold value Vd1 is lower than the BATT voltage by a predetermined voltage and the second threshold voltage Vd2 is equal to or higher than the BATT voltage by a predetermined voltage.

Next, whether the PDU voltage is equal to or lower than the first threshold value Vd1 is checked (Step S12). When the PDU voltage is determined not to be equal to or lower than the first threshold value Vd1, whether or not the PDU voltage exceeds the second threshold voltage Vd2 is checked (Step S13).

When it is determined that the PDU voltage does not exceed the second threshold voltage Vd2, the switching operation of the voltage increasing switching circuit 53 of the DC-DC converter 50 is stopped to stop an initial charging operation (step S15). Then, the control flow advances to a step S22 of FIG. 12B. On the other hand, when it is determined at the step S13 that the PDU voltage exceeds the second threshold voltage Vd2, the switching operation of the voltage increasing switching circuit 53 of the DC-DC converter 50 is stopped to stop the initial charging operation. Also, the voltage decreasing mode is set and the voltage decreasing switching circuit 51 of the DC-DC converter 50 decreases the PDU voltage (Step S14). After that, the control flow advances to the step S22.

When it is determined at the above step S12 that the PDU voltage is equal to or lower than the first threshold value Vd1 of the permission voltage range, the switching operation of the voltage increasing switching circuit 53 of the DC-DC converter 50 is set or held to the ON state. Also, the switching operation of the voltage decreasing switching circuit 51 of the DC-DC converter 50 is set to the OFF state (Step S16). Thus, the initial charging operation is continued (Steps S17 to S21).

However, in the initial charging operation, whether or not there is an engine (ENG) start request is first checked (Step S17). Then, when it is determined that there is not the engine start request, the normal mode is set (step S18). Then, the control flow advances to the step S20. On the other hand, when it is determined there is the engine start request, the quick mode is set (step S19). After that, the control flow advances to the step S20. At the step S20, whether or not the decrease of the output voltage (12 V) of the auxiliary battery 60 is rapid is checked (Step S20). When it is determined that the decrease of the output voltage of the auxiliary battery 60 is not rapid, the control flow advances to the step S22. On the other hand, when it is determined that the decrease of the output voltage of the auxiliary battery 60 is rapid, the slow mode is set (step S21). Then, the control flow advances to the step S22.

At the step S22, whether or not the PDU voltage is in the permission voltage range is checked. When the PDU voltage is determined not to be in the permission voltage range, whether or not a preset ruled time passed is checked (Step S25). When it is determined that the ruled time does not pass, it is not possible to determine that the state does not enter the steady state yet, and therefore, the electronic control unit 80 ends the processing. On the other hand, when it is determined that the ruled time passed, the electronic control unit 80 determines that it is extraordinary or a fault has occurred. The electronic control unit 80 stops the switching operation of the voltage increasing switching circuit 53 of the DC-DC converter 50 to stop the initial charging operation. Also, the electronic control unit 80 stops the switching operation of the voltage decreasing switching circuit 51 of the DC-DC converter 50. Then, the electronic control unit 80 ends the processing.

When it is determined at the above step S22 that the output voltage of the main battery 10 and the input voltage of the smoothing condenser 31 are in the permission voltage range, the main contactor 24*a* (M/C) and the sub-contactor 24*b* (S/C) are set to the ON state (Step S23). Next, the switching operation of the voltage increasing switching circuit 53 is stopped. Also, the switching operation of the voltage decreasing switching circuit 51 of the DC-DC converter (DV) is stopped (Step S24).

Next, whether there is a battery charging current to the main battery 10 as shown in FIG. 11 after the closure of the main contactor 24*a* and the sub-contactor 24*b* is checked (Step S27). That is, by checking the sensing result of the battery current sensor 12, an extraordinary state in which the voltage increasing switching operation does not stop due to the oscillation of the DC-DC converter 50 or the voltage of the smoothing condenser 31 is over-increased due to a detection error of the voltage sensor 32 is determined. It is determined that any fault does not occur when it is determined that there is not a battery charging current. Then, the processing is ended.

An extraordinary state (over-precharge fault) is recognized in the initial charging operation when it is determined at the above step S27 that there is the battery charging current. As a result, the switching operation of the voltage increasing switching circuit 53 of the DC-DC converter 50 is stopped. Also, the switching operation of the voltage decreasing switching circuit 51 of the DC-DC converter 50 is set to the ON state (Step S28). Next, whether or not there is a battery charging current is checked after the initial charging operation is stopped, and the switching operation of the voltage decreasing switching circuit 51 of the DC-DC converter 50 is set to the ON state (Step S29). When it is determined that there is no battery charging current, the processing ends. On the other hand, it is determined that the initial charging operation fault has occurred when it is determined that there is the battery charging current, and the main contactor 24*a* (M/C) and the sub-contactor 24*b* (S/C) are opened (Step S30). After that, the processing ends.

According to the above structure, when the engine start request is issued in addition to the system start-up upon the start up, or the rapid voltage down of the auxiliary battery 60 occurs, the best initial charging operation is carried out. Therefore, the system starting time can be set optimal.

Also, the restart of the system never becomes impossible unlike the conventional power supply apparatus. Even if the fault has occurred that the voltage boosting operation of the DC-DC converter 50 does not stop, the situation that the auxiliary battery 60 becomes empty can be avoided. Moreover, because the present invention does not need a special fault detection circuit, the rise of the manufacturing cost of the power supply apparatus cost can be avoided.

As described above, according to the present invention, before power supply to the inverter is started, the electronic control unit controls the bi-directional DC-DC converter such that the smoothing condenser is precharged to a voltage within a predetermined permission voltage range from the voltage of the main battery, and then the switches are closed. Therefore, the resistor and the switch for the rush current suppression can be omitted, which are used in the conventional power supply apparatus. In this way, the vehicle using the cheap power supply apparatus can be provided with the simple circuit structure.

What is claimed is:

1. A power supply apparatus for a vehicle, comprising:
    a first battery unit;
    a second battery unit for a lower voltage than said first battery unit;
    an inverter circuit which inputs a voltage from said first battery unit through switches;
    a smoothing condenser provided between said first battery unit and said inverter circuit in parallel;
    a DC-DC converter provided between said smoothing condenser and said second battery unit to voltage-convert electric energy stored in said first battery unit or said smoothing condenser to supply to said second battery unit, and to voltage-convert electric energy stored in said second battery unit to supply to said smoothing condenser;
    an electronic control unit which controls said DC-DC converter before starting power supply to said inverter circuit, such that said switches are closed after said smoothing condenser is charged to a voltage within a predetermined permission voltage range from the voltage of said first battery unit;
    wherein said DC-DC converter comprises:
    a voltage decreasing switching circuit connected with said smoothing condenser;
    a voltage increasing switching circuit connected with said second battery unit; and
    a transformer provided between said voltage decreasing switching circuit and said voltage increasing switching circuit, and
    said voltage increasing switching circuit is driven by said electronic control unit to carry out a switching operation such that the voltage from said second battery unit is boosted and supplied to said smoothing condenser, and
    said voltage decreasing switching circuit is driven by said electronic control unit to carry out a switching operation such that the voltage supplied through said switches from said first battery unit is decreased and supplied to said second battery unit;
    wherein said electronic control unit stops the switching operation of said voltage increasing switching circuit, when the voltage applied to said smoothing condenser is higher than an output voltage of said first battery unit, and operates said voltage decreasing switching circuit.

2. The power supply apparatus of the vehicle according to claim 1, wherein said electronic control unit decreases a power supply duty of said voltage increasing switching circuit, when the voltage of said second battery unit decreases in response to the switching operation of said voltage increasing switching circuit.

3. The power supply apparatus of the vehicle according to claim 1, wherein said electronic control unit decreases a switching frequency of a switching element of said voltage increasing switching circuit, when the voltage of said second battery unit decreases in response to the switching operation of said voltage increasing switching circuit.

4. The power supply apparatus of the vehicle according to claim 1, wherein said electronic control unit checks a charging current to and a discharging current from said first battery unit after said switches are closed, and outputs an extraordinary signal when the charging current is detected.

5. The power supply apparatus of the vehicle according to claim 1, said electronic control unit checks the charging current to and the discharging current from said first battery unit after said switches are closed, and drives said voltage decreasing switching circuit until the voltage applied to said smoothing condenser becomes lower by a predetermined voltage than the voltage of said first battery unit when the charging current is detected.

6. The power supply apparatus of the vehicle according to claim 1, wherein said electronic control unit opens said switches and outputs an extraordinary signal, when the voltage applied to said smoothing condenser does not become lower by the predetermined voltage than the voltage of said first battery unit, even if said electronic control unit drives said voltage decreasing switching circuit.

7. The power supply apparatus of the vehicle according to claim 1, further comprising:
    an internal combustion engine; and
    a motor which is driven by said inverter circuit and is driven by said internal combustion engine to generate electric power,
    wherein said electronic control unit increases the power supply duty of a voltage increasing switching circuit when a start request of said internal combustion engine is issued.

8. The power supply apparatus of the vehicle according to claim 1, further comprising:
    an internal combustion engine; and
    a motor which is driven by said inverter circuit and is driven by said internal combustion engine to generate electric power,
    wherein said electronic control unit increases the switching frequency of the switching element of a voltage increasing switching circuit when the start request of said internal combustion engine is issued.

9. An automobile, comprising:
    a first battery unit for a higher DC voltage power;
    a second battery unit for a lower DC voltage power;
    a smoothing condenser selectively connected with said first battery unit, and provided to supply power obtained from the high DC voltage power of said first battery unit to a motor in a steady state in which said automobile is driven with the power; and
    a DC-DC converter connected with said smoothing condenser and said second battery unit, and provided to charge said smoothing condenser using the lower DC voltage power of said second battery unit in an initial precharging state prior to the steady states
    wherein said DC-DC converter comprises:
    a transformer provided;

a voltage decreasing switching circuit provided between said smoothing condenser and said transformer, to rectify first input power from said transformer in case of no control signal and to carry out a first switching operation to second input power from said smoothing condenser in response to a voltage decreasing control signal to decrease an output voltage; and a voltage increasing switching circuit provided between said second battery unit and said transformer, to rectify third input power from said transformer in case of no control signal and to carry out a second switching operation to fourth input power from said second battery unit in response to a voltage increasing control signal to increase an output voltage;

wherein said automobile further comprises an electronic control unit which issues said voltage increasing control signal to said voltage increasing switching circuit in the initial charging operation, when the charged voltage of said smoothing condenser is equal to or lower than a first threshold voltage.

10. The automobile according to claim 9, further comprising an electronic control unit which controls said DC-DC converter based on at least one of a charged voltage of said smoothing condenser, a voltage of said second battery unit, and an engine start request.

11. The automobile according to claim 9, wherein said electronic control unit controls said DC-DC converter based on the charged voltage of said smoothing condenser such that a voltage obtained by boosting a voltage of said second battery unit is increased, when the charged voltage of said smoothing condenser is equal to or lower than a first threshold voltage.

12. The automobile according to claim 9, wherein said electronic control unit controls said DC-DC converter based on the charged voltage of said smoothing condenser such that a voltage obtained by boosting a voltage of said second battery unit is decreased, when the charged voltage of said smoothing condenser is higher than a second threshold voltage which is higher than a first threshold voltage.

13. The automobile according to claim 9, wherein said electronic control unit controls said DC-DC converter based on absence of the engine start request such that said smoothing condenser is charged in a normal mode in a predetermined rate.

14. The automobile according to claim 13, wherein said electronic control unit controls said DC-DC converter based on presence of the engine start request such that said smoothing condenser is charged in a quick mode in a larger rate than the predetermined rate.

15. The automobile according to claim 9, wherein said electronic control unit controls said DC-DC converter based on the voltage of said second battery unit such that said smoothing condenser is charged in a slow mode in a smaller rate than a predetermined rate.

16. The automobile according to claim 9, wherein said electronic control unit issues said voltage decreasing control signal to said voltage decreasing switching circuit in the initial charging operation, when the charged voltage of said smoothing condenser is higher than a second threshold voltage which is higher than said first threshold voltage.

17. The automobile according to claim 9, wherein said electronic control unit controls said second switching operation such that at least one of a switching frequency and a switching duty is larger than a corresponding one of a predetermined switching frequency and a predetermined switching duty when the engine start request is present.

18. The automobile according to claim 17, wherein said electronic control unit controls said second switching operation such that at least one of a switching frequency and a switching duty is equal to the corresponding one of the predetermined switching frequency and the predetermined switching duty when the engine start request is not present.

19. The automobile according to claim 17, wherein said electronic control unit controls said second switching operation such that at least one of a switching frequency and a switching duty is smaller than to the corresponding one of the predetermined switching frequency and the predetermined switching duty when the voltage of said second battery unit falls.

20. The automobile according to claim 9, wherein said electronic control unit connects said first battery unit with said smoothing condenser to enter the steady state when the initial charging operation is ended.

21. The automobile according to claim 9, wherein said electronic control unit detects a fault when there is a battery charging current in the steady state.

* * * * *